(12) United States Patent
Chen et al.

(10) Patent No.: US 11,650,919 B2
(45) Date of Patent: May 16, 2023

(54) SYSTEM AND METHOD FOR MACHINE LEARNING-DRIVEN CACHE FLUSHING

(71) Applicant: EMC IP Holding Company, LLC, Hopkinton, MA (US)

(72) Inventors: Xiangping Chen, Sherborn, MA (US); David Meiri, Somerville, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 210 days.

(21) Appl. No.: 17/232,428

(22) Filed: Apr. 16, 2021

(65) Prior Publication Data

US 2022/0334966 A1    Oct. 20, 2022

(51) Int. Cl.
*G06F 12/0804* (2016.01)
*G06N 20/00* (2019.01)
*G06N 5/04* (2006.01)

(52) U.S. Cl.
CPC ......... *G06F 12/0804* (2013.01); *G06N 5/04* (2013.01); *G06N 20/00* (2019.01); *G06F 2212/601* (2013.01)

(58) Field of Classification Search
CPC ......... G06F 12/0804; G06F 2212/601; G06N 20/00; G06N 5/04
See application file for complete search history.

(56) References Cited

U.S. PATENT DOCUMENTS

| | | | |
|---|---|---|---|
| 11,216,186 B1 * | 1/2022 | Armangau | G06F 3/0689 |
| 2020/0371720 A1 * | 11/2020 | Yamamoto | G06F 3/0613 |
| 2021/0165579 A1 * | 6/2021 | Bernat | G06F 1/30 |

* cited by examiner

*Primary Examiner* — Baboucarr Faal
(74) *Attorney, Agent, or Firm* — Brian J. Colandreo; Heath M. Sargeant; Holland & Knight LLP

(57) ABSTRACT

A method, computer program product, and computing system for receiving, at a cache memory system, a write request for writing data to a storage system. A data reduction rate may be predicted for the write request. One or more portions of memory within the storage system may be allocated based upon, at least in part, the predicted data reduction rate for the write request. The write request may be flushed from the cache memory system to the allocated one or more portions of memory within the storage system.

20 Claims, 6 Drawing Sheets

SYSTEM AND METHOD FOR MACHINE LEARNING-DRIVEN CACHE FLUSHING

BACKGROUND

Storing and safeguarding electronic content may be beneficial in modern business and elsewhere. Accordingly, various methodologies may be employed to protect and distribute such electronic content.

In many storage systems, data may be saved in a cache memory system upon ingest. The cache memory system typically decides when and how to destage (or flush) data to persistent storage. For data optimization purposes, when data is stored in a cache memory system, the data is not subjected to data compression or deduplication. When a storage system flushes data to persistent storage (e.g., a data array with a plurality of disks or storage targets), a physical storage chunk must be allocated to hold the data. When a data flush transaction starts, the storage system typically reserves free storage chunks and sends IO requests to the persistent storage to write the data to the reserved memory blocks. If free physical space is hard to find, which can happen in a highly utilized or highly fragmented system, then the storage system will try to find partially utilized storage chunks, and perform compact and append operations to append new data to existing data in the storage chunks.

It may be ideal for storage chunks to be either completely free or fully utilized within the storage system. For example, when the storage system has to use partially utilized storage chunks to perform compact and append operation, it has to copy data from partially utilized large block to a new free memory chunk ("compact operation"), and then put the newly written data at the end of the new memory chunk ("append operation") (e.g., a "C&A" operation). With each C&A operation, some data has to be copied from one memory chunk to another memory chunk, which reduces storage system performance and disk amortization. However, due to inline compression and deduplication variances among types of data, a memory chunk may not be fully utilized after data flushing, thus creating new partially utilized storage chunks and further disk fragmentation.

SUMMARY OF DISCLOSURE

In one example implementation, a computer-implemented method executed on a computing device may include, but is not limited to, receiving, at a cache memory system, a write request for writing data to a storage system. A data reduction rate may be predicted for the write request. One or more portions of memory within the storage system may be allocated based upon, at least in part, the predicted data reduction rate for the write request. The write request may be flushed from the cache memory system to the allocated one or more portions of memory within the storage system.

One or more of the following example features may be included. Receiving the write request for writing data to the storage system may include storing the write request within the cache memory system without performing data compression or data deduplication. Predicting the data reduction rate for the write request may include training a machine learning model to predict the data reduction rate for the write request. Training the machine learning model to predict the data reduction rate for the write request may include weighting a plurality of data reduction factors for the write request. Allocating the one or more portions of memory within the storage system based upon, at least in part, the predicted data reduction rate for the write request may include allocating one or more partially utilized memory blocks within the storage system based upon, at least in part, the predicted data reduction rate for the write request. Flushing the write request from the cache memory system to the allocated one or more portions of memory within the storage system may include performing one or more data reduction operations on the write request based upon, at least in part, the predicted data reduction rate for the write request. In response to flushing the write request from the cache memory system to the allocated one or more portions of memory within the storage system, an actual data reduction rate for the write request may be determined. The machine learning model may be updated with the actual data reduction rate for the write request.

In another example implementation, a computer program product resides on a computer readable medium that has a plurality of instructions stored on it. When executed by a processor, the instructions cause the processor to perform operations that may include, but are not limited to, receiving, at a cache memory system, a write request for writing data to a storage system. A data reduction rate may be predicted for the write request. One or more portions of memory within the storage system may be allocated based upon, at least in part, the predicted data reduction rate for the write request. The write request may be flushed from the cache memory system to the allocated one or more portions of memory within the storage system.

One or more of the following example features may be included. Receiving the write request for writing data to the storage system may include storing the write request within the cache memory system without performing data compression or data deduplication. Predicting the data reduction rate for the write request may include training a machine learning model to predict the data reduction rate for the write request. Training the machine learning model to predict the data reduction rate for the write request may include weighting a plurality of data reduction factors for the write request. Allocating the one or more portions of memory within the storage system based upon, at least in part, the predicted data reduction rate for the write request may include allocating one or more partially utilized memory blocks within the storage system based upon, at least in part, the predicted data reduction rate for the write request. Flushing the write request from the cache memory system to the allocated one or more portions of memory within the storage system may include performing one or more data reduction operations on the write request based upon, at least in part, the predicted data reduction rate for the write request. In response to flushing the write request from the cache memory system to the allocated one or more portions of memory within the storage system, an actual data reduction rate for the write request may be determined. The machine learning model may be updated with the actual data reduction rate for the write request.

In another example implementation, a computing system includes at least one processor and at least one memory architecture coupled with the at least one processor, wherein the at least one processor configured to receive, at a cache memory system, a write request for writing data to a storage system, wherein the at least one processor is further configured to predict a data reduction rate for the write request, wherein the at least one processor is further configured to allocate one or more portions of memory within the storage system based upon, at least in part, the predicted data reduction rate for the write request, and wherein the at least one processor is further configured to flush the write request from the cache memory system to the allocated one or more portions of memory within the storage system.

One or more of the following example features may be included. Receiving the write request for writing data to the storage system may include storing the write request within the cache memory system without performing data compression or data deduplication. Predicting the data reduction rate for the write request may include training a machine learning model to predict the data reduction rate for the write request. Training the machine learning model to predict the data reduction rate for the write request may include weighting a plurality of data reduction factors for the write request. Allocating the one or more portions of memory within the storage system based upon, at least in part, the predicted data reduction rate for the write request may include allocating one or more partially utilized memory blocks within the storage system based upon, at least in part, the predicted data reduction rate for the write request. Flushing the write request from the cache memory system to the allocated one or more portions of memory within the storage system may include performing one or more data reduction operations on the write request based upon, at least in part, the predicted data reduction rate for the write request. In response to flushing the write request from the cache memory system to the allocated one or more portions of memory within the storage system, an actual data reduction rate for the write request may be determined. The machine learning model may be updated with the actual data reduction rate for the write request.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
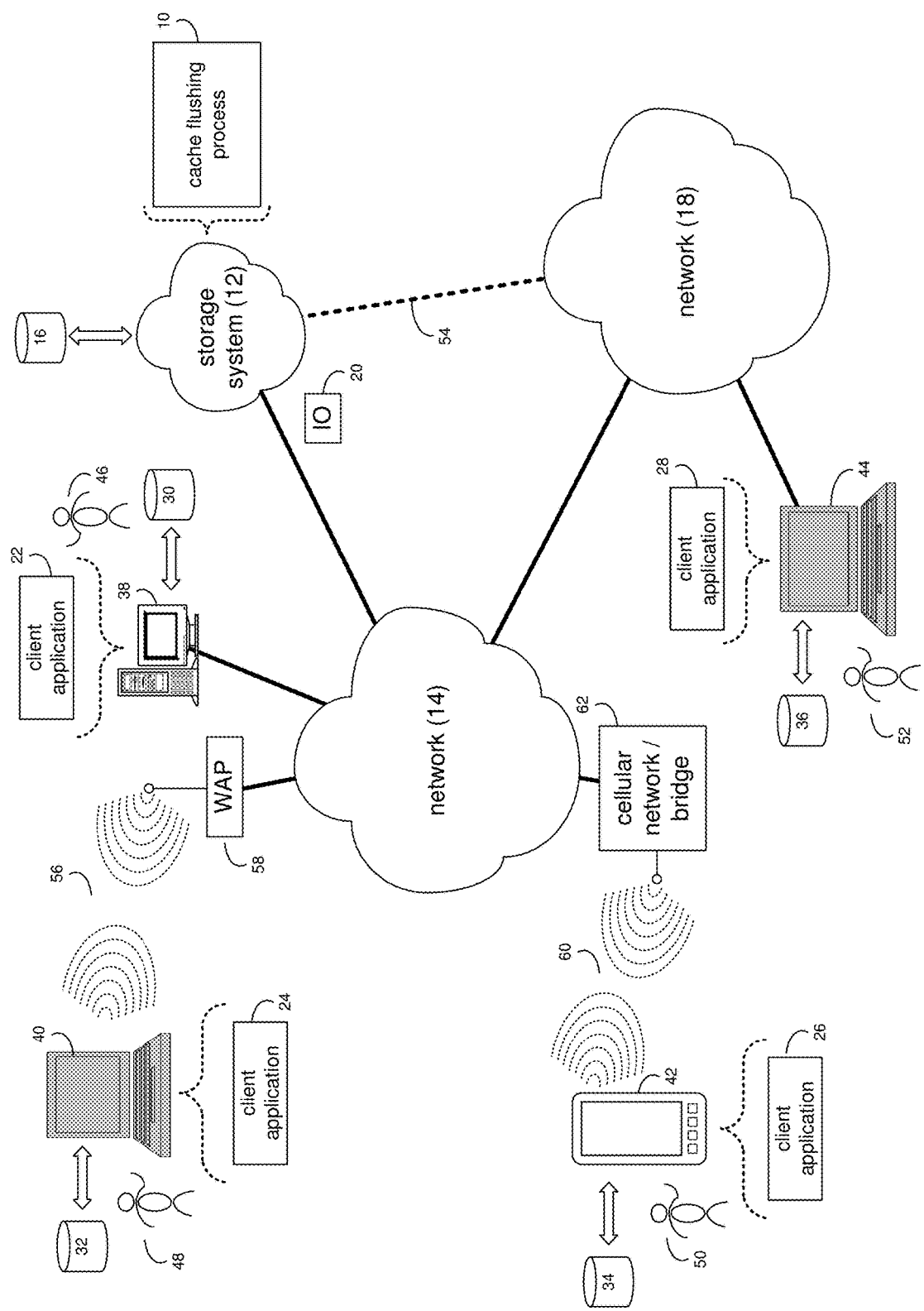
FIG. 1 is an example diagrammatic view of a storage system and a cache flushing process coupled to a distributed computing network according to one or more example implementations of the disclosure.

Referring to FIG. 1, there is shown cache flushing process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of cache flushing process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of cache flushing process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a cache flushing process, such as cache flushing process 10 of FIG. 1, may include but is not limited to, receiving, at a cache memory system, a write request for writing data to a storage system. A data reduction rate may be predicted for the write request. One or more portions of memory within the storage system may be allocated based upon, at least in part, the predicted data reduction rate for the write request. The write request may be flushed from the cache memory system to the allocated one or more portions of memory within the storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
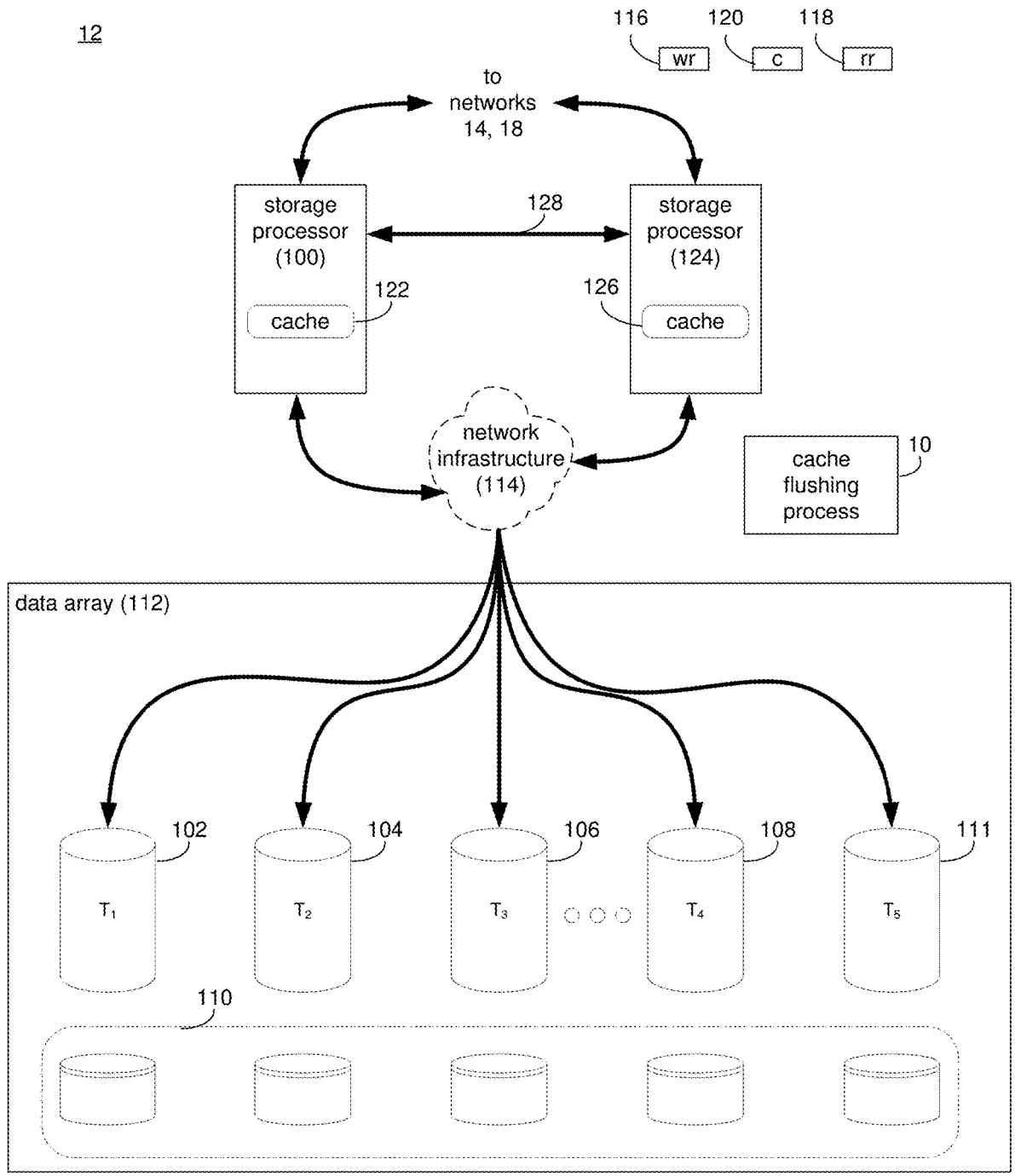
FIG. 2 is an example diagrammatic view of the storage system of FIG. 1 according to one or more example implementations of the disclosure.
Figure 3:
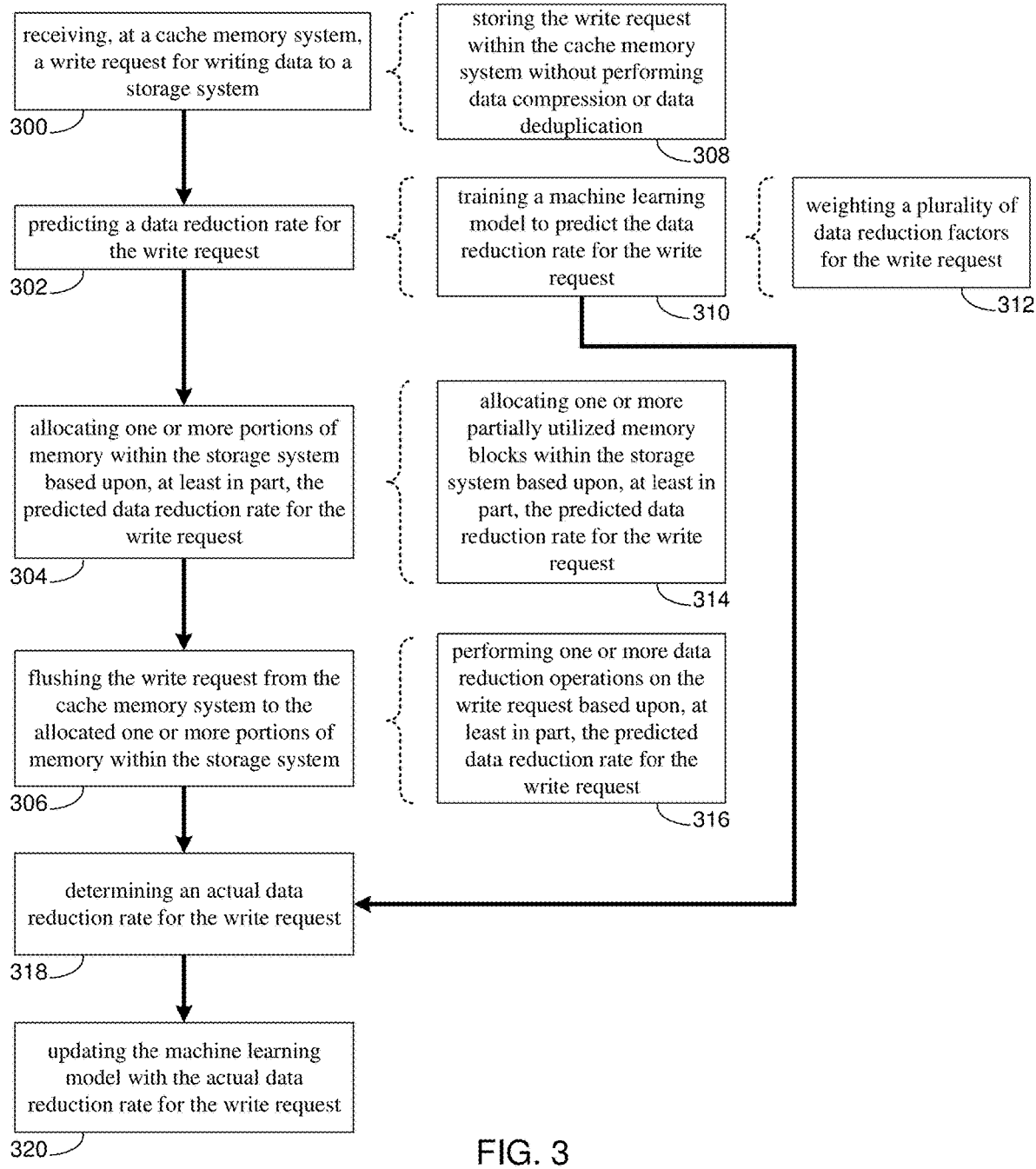
FIG. 3 is an example flowchart of cache flushing process according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of cache flushing process 10. The instruction sets and subroutines of cache flushing process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of cache flushing process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of cache flushing process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of cache flushing process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Cache Flushing Process

Referring also to FIGS. 3-6 and in some implementations, cache flushing process 10 may receive 300, at a cache memory system, a write request for writing data to a storage system. A data reduction rate may be predicted 302 for the write request. One or more portions of memory within the storage system may be allocated 304 based upon, at least in part, the predicted data reduction rate for the write request. The write request may be flushed 306 from the cache memory system to the allocated one or more portions of memory within the storage system.

As will be discussed in greater detail below, cache flushing process 10 may allow for machine learning-drive cache flushing. For example, in many storage systems, data is usually saved in a cache memory system upon ingest. The cache memory system typically decides when and how to destage (or flush) data to persistent storage. There are several benefits of performing asynchronous background data destage. For one, it gives the storage system an opportunity to accumulate consecutive or overlapped write requests to the same logical addresses and reduce the actual writes to disk; it also provides flexibility to group data to be written to locations that would be optimal for later retrieval/ read operations; in addition, it allows the storage system to perform inline compression and deduplication while destaging data, which further reduces on disk data writes and improves backend performance and flash drive wear leveling.

When a storage system flushes data to the persistent storage (e.g., a data array with a plurality of disks or storage targets), a physical area on disk must be allocated to hold the data. When a data flush transaction starts, the storage system typically reserves a free large block, updates metadata associated with the free large block, and sends IO requests to the data array to write the data to the large block. If free large blocks are hard to find, which could happen in a highly utilized or highly fragmented system, then the storage system will try to find partially utilized large blocks, and perform compact and append operations to append new data to existing data in the large blocks.

In some implementations, it may be ideal for physical large blocks to be either completely free or fully utilized within the storage system. For example, when the storage system has to use partially utilized blocks to perform compact and append operation, it has to copy data from partially utilized large block to a new free large block ("compact operation"), and then put the newly written data at the end of the new large block ("append operation") (e.g., a "C&A" operation). With each C&A operation, some data has to be copied from one large block to another large block, which reduces storage system performance and disk amortization. However, due to inline compression and deduplication variances among types of data, a large block may not be fully utilized after data destage, thus create new partially utilized blocks.

In some implementations, when data is stored in a cache memory system, the data is typically stored in a form optimized for read and write operations. As such, the cached data may not be compressed or deduplicated. As will be discussed in greater detail below, cache flushing process 10 may provide more efficient utilization of blocks allocated for flushing data from a cache memory system by predicting (e.g., with a machine learning model) how much data will be written to the disk when various data reduction operations (e.g., data compression, data deduplication, etc.) are performed on the data during flushing. Additionally, implementations of cache flushing process 10 may guide which data reduction operations to perform on cached data, which may allow the storage system to reallocate central processing unit (CPU) and memory resources that might otherwise be applied to data reduction operations performed on data that may not benefit from o respond to data reduction.

Figure 4:
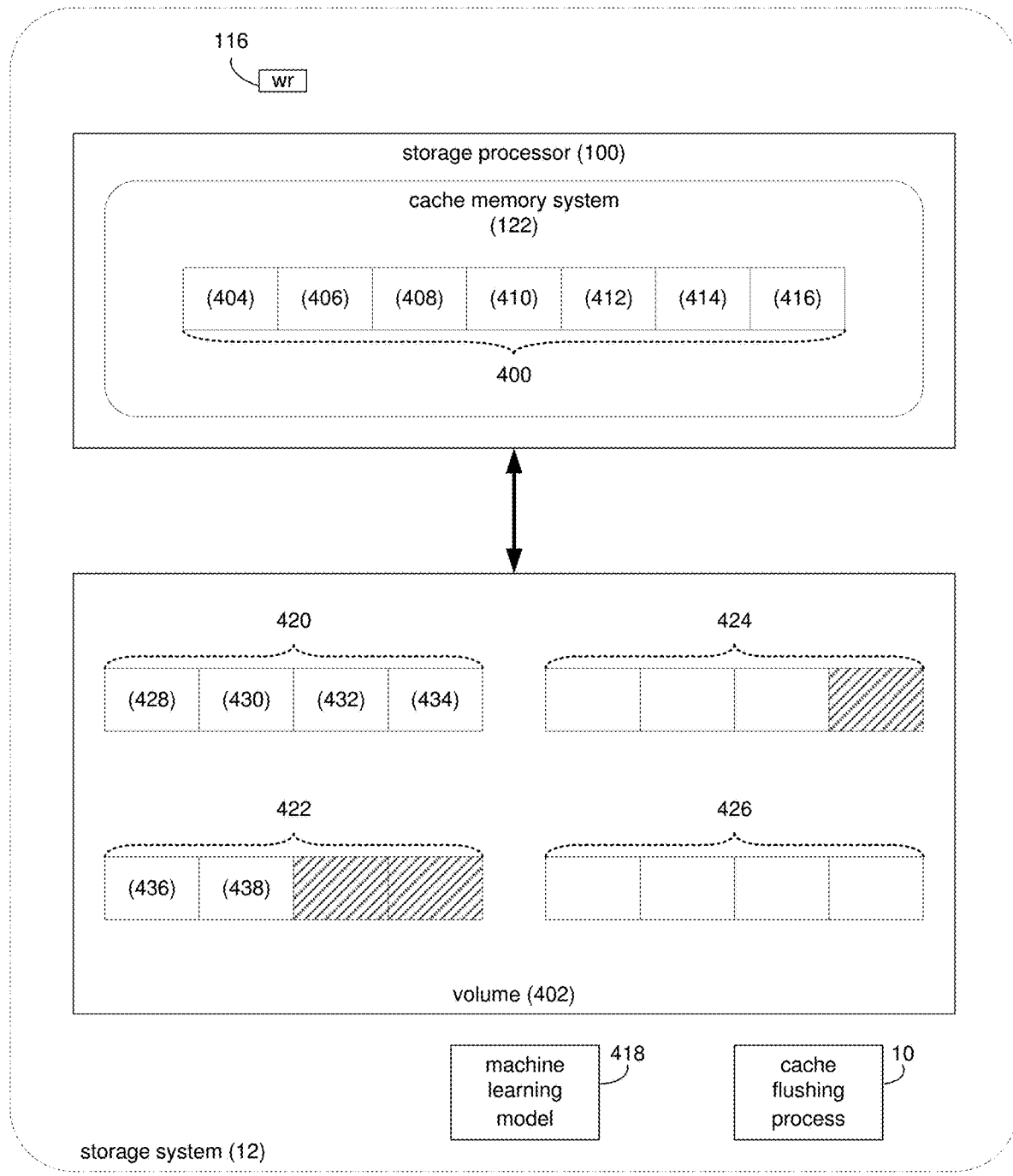
FIGS. 4-6 are example diagrammatic views of the storage system of FIG. 1 according to one or more example implementations of the disclosure.

In some implementations, cache flushing process 10 may receive 300, at a cache memory system, a write request for writing data to a storage system. Referring also to FIG. 4 and in some implementations, suppose a write request (e.g., write request 116) is received 300 at a cache memory system (e.g., cache memory system 122) of a storage processor (e.g., storage processor 100) of a storage system (e.g., storage system 12). In this example, suppose that write request 116 includes data to be written (e.g., data 400) to a volume (e.g., volume 402) within storage system 12. As shown in FIG. 4, suppose that data 400 includes e.g., seven data portions (e.g., portions 404, 406, 408, 410, 412, 414, 416) to be stored in volume 402. A data portion as used herein may include any unit of data. While an example of data 400 including e.g., seven data portions has been described, it will be appreciated that this is for example purposes only and that any amount of data may be received 300 for writing to a storage system within the scope of the present disclosure.

In some implementations, receiving 300 the write request for writing data to the storage system may include storing 308 the write request within the cache memory system without performing data compression or data deduplication. For example, cache flushing process 10 may store 308 the data of the write request (e.g., data 400) in a form optimized for read and write operations. Accordingly, cache flushing process 10 may store 308 data 400 of write request 116 in cache memory system 122 without performing any data reduction operations (e.g., data compression, data deduplication, etc.). As will be discussed in greater detail below, because data reduction operations are not performed on cached data, allocating portions of memory for flushing the cache data may not account for data reduction operations performed when flushing the data to the backend (e.g., disk volumes or other persistent storage containers of a storage system).

In some implementations, cache flushing process 10 may predict 302 a data reduction rate for the write request. A data reduction rate may indicate the degree or amount by which data may be reduced, compressed, or deduplicated in response to data reduction operations performed on the data. For example and as discussed above, when data is stored 308 in a cache memory system, data reduction operations may not be performed on the data. However, when flushing data to the storage system, cache flushing process 10 may perform one or more data reduction operations on the data to reduce the size of the data on the storage system. In some implementations, different applications (e.g., data associated with different applications) may have distinct data reduction characteristics (e.g., data compression and deduplication characteristics).

For example, data in a virtualized environment may be susceptible to significant data deduplication. In one example, virtual machines may a common set of files or applications, leading to repeating blocks of data. In some implementations, database logs or data files may be susceptible to effective data compression. For example, data records may contain unique identifiers, such as record identifiers, that make deduplication ineffective, but may have redundant data (such as empty fields or repeating fields) which may allow data compression to be highly effective. In some implementations, file systems may exhibit either of these behaviors, or perhaps no data reduction capability at all (e.g., if they contain e.g., .JPEG pictures, which are already compressed.) Another example is host-encrypted volume data, where data reduction operations (e.g., compression or deduplication) may be ineffective.

In some implementations, certain application data may, in addition to exhibiting distinct deduplication and compression characteristics, may also exhibit distinct IO patterns. For example, database transaction logs may be updated in a constant sequential write and overwrite pattern, while database record data may be updated in a random manner. Accordingly, it will be appreciated that various factors may influence how data reduction operations impact the size of data when flushing to persistent memory.

In some implementations, predicting 302 the data reduction rate for the write request may include training 310 a machine learning model to predict the data reduction rate for the write request. For example, the nature of data reduction may be applied to machine learning processes because of the difficultly in pre-configuring a storage system to do compression only in some cases, data reduction in other cases, or both in other cases. As applications change their behavior and write profiles, volumes change their attributes and statistics, etc., storage systems may need to adapt to various changes in data reduction. As will be discussed in greater detail below, cache flushing process 10 may provide a self-correcting machine learning model for predicting a data reduction rate and may use the predicted data reduction rate to determine whether or not to compress data, perform deduplication operations on the data, do both, or do none, based on available training data.

In some implementations, cache flushing process 10 may train 310 a machine learning model (e.g., machine learning model 418) to predict the data reduction rate for the write request. As is known in the art, a machine learning model (e.g., machine learning model 418) may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As it navigates its problem space, the program is provided feedback that's analogous to rewards, which it tries to maximize. While three examples of machine learning approaches have been provided, it will be appreciated that other machine learning approaches are possible within the scope of the present disclosure.

In some implementations, training 310 the machine learning model to predict the data reduction rate for the write request may include weighting 312 a plurality of data reduction factors for the write request. For example, cache flushing process 10 may identify a plurality of data reduction factors that may impact the data reduction rate. Examples of data reduction factors generally include an amount of data to be flushed in current transaction; a number of contiguous extents (randomness of data IO), an address range (spatial locality); the current data reduction rate of the same volume or volume group; an application profile hint defining a data reduction rate for a particular application; a volume identifier; etc. In some implementations, a user may provide and/or select the plurality of reduction factors for cache flushing process 10 to use in training 310 machine learning model 418. For example, cache flushing process 10 may allow a user to provide training data and/or to select training data (e.g., via a user interface) for use in training 310 machine learning model 418. While various examples of data reduction factors have been described, it will be appreciated that any factor or characteristic that impacts the data reduction rate for data may be used to train 310 machine learning model 418 within the scope of the present disclosure.

In some implementations, cache flushing process 10 may weight 312 the plurality of data reduction factors for the write request. For example, cache flushing process 10 may identify a set of data reduction factors (e.g., $x_i$ with n data reduction factors from training data). Cache flushing process 10 may determine an actual data reduction rate (y) from the training data for the plurality of data reduction factors ($x_i$). Cache flushing process 10 may use linear regression to predict 302 the data reduction rate, with hypothesis function h(x) as shown below in Equation 1:

$$h(x)=\theta_0+\theta_1 x_1+ \ldots +\theta_n x_n \quad (1)$$

where h(x) is the predicted data reduction rate, and $\theta_i$ represents the weight of each feature. $\theta_0$ default value is "1", denoting that the minimum data reduction rate is 1.

Cache flushing process 10 may use the error function of Equation 2 to measure and optimize the accuracy of the prediction, where m is the size of the training data set or past data flushing statistics:

$$\partial(\theta) = \frac{1}{2m}\sum_{i=1}^{m}(h(x^i) - y^i)^2 \quad (2)$$

Cache flushing process 10 may utilize known machine learning methods such as gradient descent to tune the weights $\theta_j$ to minimize the error value using the training data set as shown below in Equation 3, where a is the learning parameter, j represents the features, i represents training data, and m is the total number of training data set:

$$\theta_j = \theta_j - \frac{\alpha}{m}\sum_{i=1}^{m}(h(x^i) - y^i)x_j^i \quad (3)$$

Accordingly, with the hypothesis function, cache flushing process 10 may train 310 machine learning model 418 to predict 302 a data reduction rate for a particular write request. In some implementations and as will be discussed in greater detail below, cache flushing process 10 may predict the data reduction rate in a flush transaction and use the predicted data reduction rate to optimize large block allocation and to minimize future needs of compact and append operation or garbage collection.

Referring again to FIG. 4 and in some implementations, suppose that data 400 is received 300 at cache memory system 122. In this example, data 400 includes e.g., seven data portions (e.g., portions 404, 406, 408, 410, 412, 414, 416) to be stored in volume 402. Suppose that data 400 includes database log files to be stored in volume 402. In some implementations, cache flushing process 10 may predict 302 a data reduction rate for the write request (e.g., data 400 of write request 116). For example, cache flushing process 10 may predict 302 a data reduction rate for data 400 using machine learning model 418. In this example, suppose that machine learning model 418 is trained 310 with various training data as described above. In some implementations, cache flushing process 10 may predict 302 (e.g., using machine learning model 418) that the seven data portions (e.g., portions 404, 406, 408, 410, 412, 414, 416) of data 400 may be reduced (e.g., via one or more data compression operations) to e.g., six data portions when flushed to volume 402. As discussed above and in this example, each data portion of data 400 may represent an arbitrary amount of data.

In some implementations, cache flushing process 10 may allocate 304 one or more portions of memory within the storage system based upon, at least in part, the predicted data reduction rate for the write request. Allocating one or more portions of memory within the storage system may generally include reserving one or more portions of memory (e.g., one or more blocks of memory) and updating metadata associated with the one or more portions of memory.

In some implementations, allocating 304 the one or more portions of memory within the storage system based upon, at least in part, the predicted data reduction rate for the write request may include allocating 314 one or more partially utilized memory blocks within the storage system based upon, at least in part, the predicted data reduction rate for the write request. For example and as discussed above, in a highly utilized or highly fragmented storage system, it may be difficult to allocate 304 free portions or blocks memory for a flush operation/transaction. In some implementations, cache flushing process 10 may identify one or more partially utilized memory blocks or large blocks, and may perform compact and append operations to append new data to existing data in one or more portions of memory for flushing cached data.

Returning to the above example, suppose that cache flushing process 10 predicts 302 (e.g., using machine learning model 418) that the seven data portions (e.g., portions 404, 406, 408, 410, 412, 414, 416) of data 400 may be reduced down to e.g., six data portions when flushed to volume 402. In this example, cache flushing process 10 may allocate 304 one or more portions of memory within the storage system based upon, at least in part, the predicted data reduction rate for the write request. For example, suppose volume 402 includes e.g., four blocks of memory (memory blocks 420, 422, 424, 426). In this example, suppose that memory blocks 420, 426 are free memory blocks while memory blocks 422, 424 are partially utilized memory blocks. In some implementations, each block of memory may be e.g., two megabytes. However, it will be appreciated that the physical storage space of storage system 12 may be partitioned into any number of memory blocks of any size within the scope of the present disclosure.

Continuing with the above example, cache flushing process 10 may allocate 304 the entirety of free memory block 420 for flushing portions 404, 406, 408, 410 of data 400 (e.g., allocating memory block portion 428 for flushing data portion 404; memory block portion 430 for flushing data portion 406; memory block portion 432 for flushing data portion 408; and memory block portion 434 for flushing data portion 410). In some implementations, cache flushing process 10 may allocate 314 one or more partially utilized memory blocks within the storage system based upon, at least in part, the predicted data reduction rate for the write request.

For example, cache flushing process 10 may allocate 314 partially utilized memory block 436 for flushing the remaining portions of data 400 (e.g., data portions 414, 416). In this example, cache flushing process 10 may allocate 314 memory block portion 436 for flushing data portion 414 and memory block portion 438 for flushing data portion 416. Accordingly, cache flushing process 10 may allocate 304 the entirety of free memory block 420 and may allocate 314 portions of partially utilized memory block 422 for flushing data 400 to volume 402 based upon, at least in part, the predicted data reduction rate for the write request. In this example, because cache flushing process 10 predicts 302 (e.g., using machine learning model 418) that data 400 may be reduced to e.g., six data portions, cache flushing process 10 may allocate 304 e.g., six corresponding memory block portions across one or more portions of memory of storage system 12 for flushing data 400.

In some implementations, cache flushing process 10 may flush 306 the write request from the cache memory system to the allocated one or more portions of memory within the storage system. Flushing data from the cache memory system may generally include destaging data from the cache memory system to persistent memory. For example, flushing 306 the write request (e.g., the data of the write request) may be performed as an asynchronous background data flush operation. In some implementations, an asynchronous background data flush operation may provide the storage system with an opportunity or window of time to accumulate consecutive or overlapped write requests to the same logical addresses and may reduce the actual writes to a disk. In some implementations, an asynchronous background data flush operation may also provide flexibility to grouped data to be written to locations that would be optimal for later retrieval/read operations. Additionally, such operations may allow the storage system to perform inline data reduction operations (e.g., data compression and/or deduplication) while flushing the data.

In some implementations, flushing 306 the write request from the cache memory system to the allocated one or more portions of memory within the storage system may include performing 316 one or more data reduction operations on the write request based upon, at least in part, the predicted data reduction rate for the write request. For example and as discussed above, data reduction operations may include data compression operations, data deduplication operations, and any other operation configured to reduce the size or footprint of data when flushed to the storage system.

Referring again to FIG. 4 and continuing with the above example, suppose cache flushing process 10 determines that data 400 includes one or more database log files to be stored in volume 402. In this example and as discussed above, database log files may contain unique identifiers, such as record identifiers, that make data deduplication ineffective, but may have redundant data (such as empty fields or repeating fields) which make data compression highly effective. In some implementations, these characteristics may be represented by training data used to train 310 machine learning model 418. Accordingly, cache flushing process 10 may predict 302 (e.g., using machine learning model 418) that data 400 may be reduced to e.g., six data portions with one or more data reduction operations. In this example, cache flushing process 10 may perform 316 the one or more data reduction operations on data 400. In some implementations, cache flushing process 10 may perform 316 a defined set of data reduction operations for reducing data when flushing the data to the storage system. However, and as will be discussed in greater detail below, cache flushing process 10 may determine which data reduction operations to perform 316 on the write request based upon, at least in part, the predicted data reduction rate for the write request.

Suppose, for example purposes only, that cache flushing process 10 performs 316 a defined set of data reduction operations on data 400. In this example and as predicted, cache flushing process 10 may reduce data 400 from e.g., seven data portions to e.g., six data portions by performing 316 a defined set of data reduction operations on data 400. In some implementations, cache flushing process 10 may perform the same set of data reduction operations on each write request when flushing the write request to the storage system.

Figure 5:
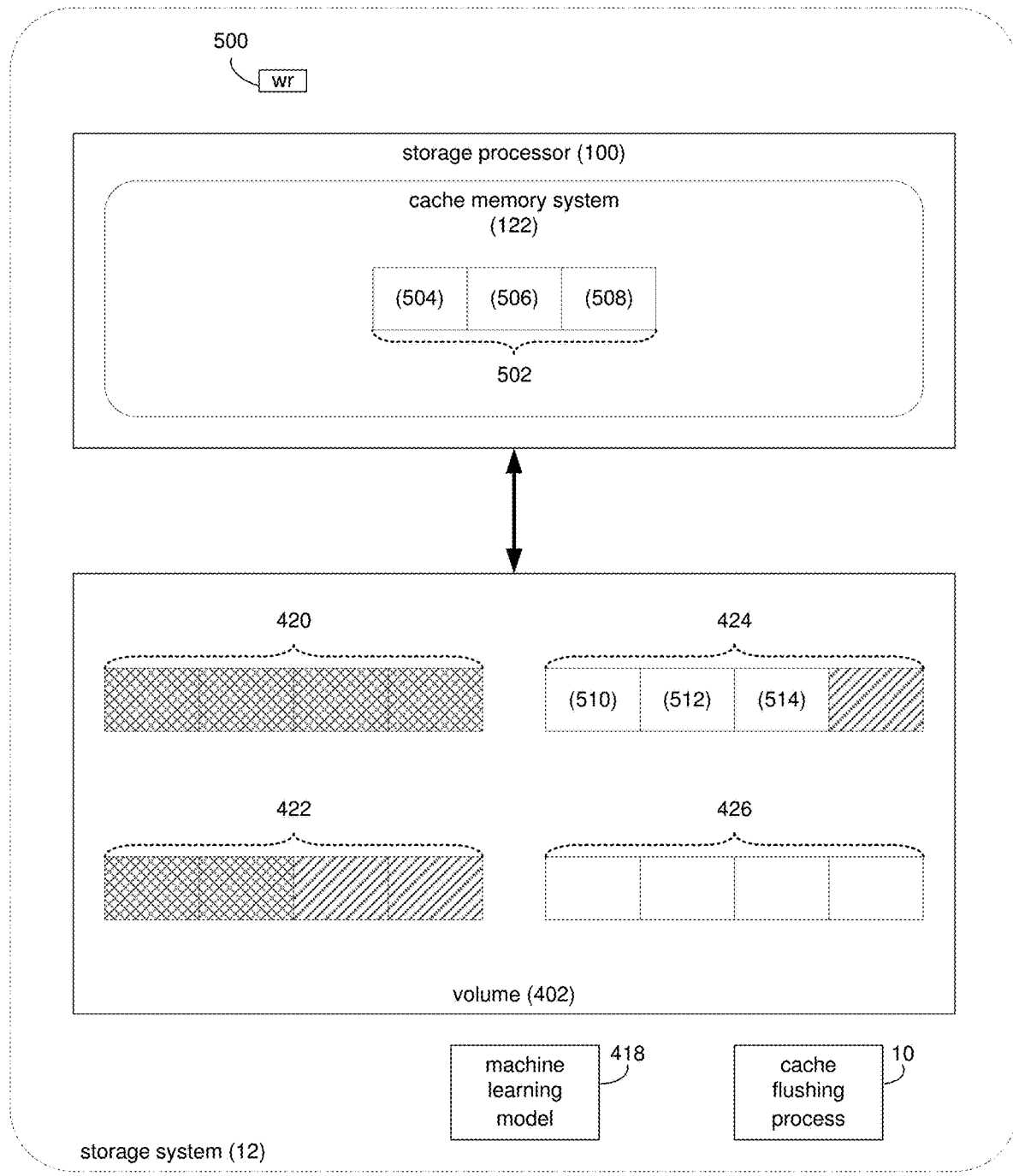

Referring again to FIG. 4 and in some implementations, cache flushing process 10 may flush 306 the data (e.g., data 400) of write request 116 from cache memory system 122 to the allocated one or more portions of memory (e.g., allocated memory block portions 428, 430, 432, 434 of memory block 420 and memory block portions 436, 438 of memory block 422) within storage system 12. In this example and as will be discussed in greater detail below, cache flushing process 10 may determine that the predicted data reduction rate (i.e., reduction of data 400 from seven data portions to six data portions) was accurate and may update the training data for machine learning model 418 accordingly. As shown in FIG. 5, memory blocks 420, 422 may be fully utilized with data 400 in response to accurately predicting 302 the data reduction rate for data 400.

In some implementations, cache flushing process 10 may perform 316 one or more data reduction operations on the write request based upon, at least in part, the predicted data reduction rate for the write request. For example, cache flushing process 10 may determine which data reduction operations to perform 316 on the write request based upon, at least in part, the predicted data reduction rate for the write request. Referring also to FIG. 5 and in some implementations, suppose that write request 500 is received at cache memory system 122. In this example, suppose that write request 116 includes data 502 configured to be written to volume 402 of storage system 12. As shown in FIG. 5, suppose that data 502 includes e.g., three data portions (e.g., data portions 504, 506, 508) to be stored in volume 402. Suppose that data 502 pertains to host-encrypted volume data. Accordingly, cache flushing process 10 may determine that data reduction operations (e.g., compression or deduplication) may be ineffective against host-encrypted volume data.

In some implementations, these characteristics may be represented by or within training data used to train 310 machine learning model 418. Accordingly, cache flushing process 10 may predict 302 (e.g., using machine learning model 418) that data 502 may not be reduced with one or more data reduction operations. Accordingly, cache flushing process 10 may allocate 314 one or more partially utilized memory blocks within the storage system based upon, at least in part, the predicted data reduction rate for the write request. For example and as shown in FIG. 5, cache flushing process 10 may allocate 314 memory block portions 510, 512, 514 of partially utilized memory block 424 for flushing data portions 504, 506, 508 of data 502.

In some implementations and continuing with the above example, cache flushing process 10 may perform 316 one or more data reduction operations on the write request based upon, at least in part, the predicted data reduction rate for the write request. For example and as discussed above, cache flushing process 10 may predict 316 that data 502 may not be reduced with one or more data reduction operations. Accordingly, instead of performing a defined set of data reduction operations on a write request, cache flushing process 10 may selectively perform 316 one or more data reduction operations on the write request based upon, at least in part, the predicted data reduction rate for the write request.

For example, cache flushing process 10 may determine which data reduction operations to perform (and/or to not perform) on the write request based upon, at least in part, the predicted data reduction rate for the write request. Returning to the above example, cache flushing process 10 may determine that, because data 502 includes host-encrypted volume data, any data reduction operations may be ineffective. In this example, cache flushing process 10 may not perform any data reduction operations on data 502. In this manner, cache flushing process 10 may improve the performance of the storage system by selectively performing one or more data reduction operations on a write request based upon, at least in part, the predicted data reduction rate for the write request.

Figure 6:
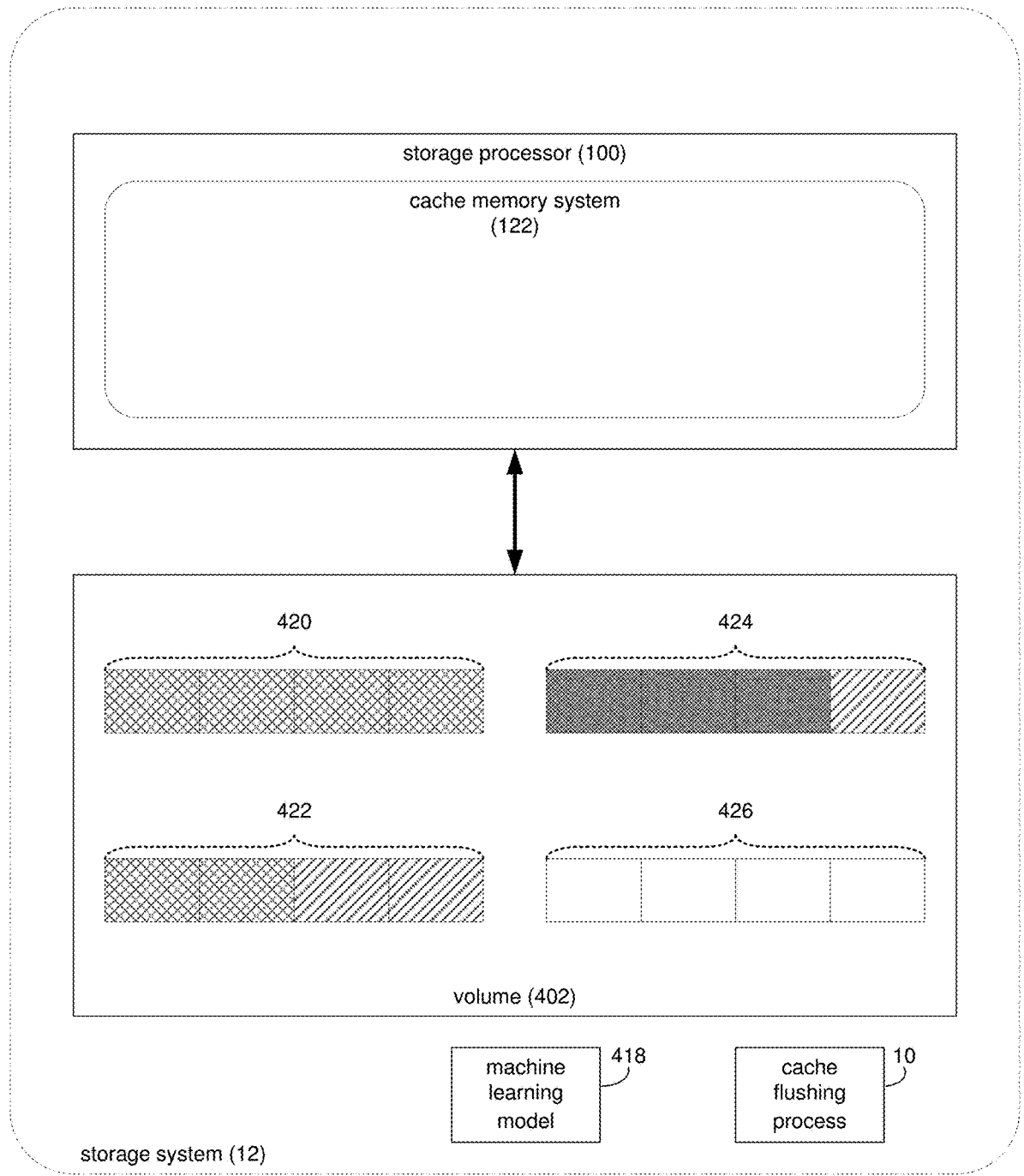

In some implementations and in response to flushing the write request from the cache memory system to the allocated one or more portions of memory within the storage system, cache flushing process 10 may determine 318 an actual data reduction rate for the write request. Referring to FIGS. 5-6 and in some implementations, cache flushing process 10 may flush 306 data 400 from cache memory system 122 to the allocated one or more portions of memory (e.g., allocated memory block portions 428, 430, 432, 434 of memory block 420 and memory block portions 436, 438 of memory block 422) within storage system 12 and data 502 from cache memory system 122 to the allocated one or more portions of memory (e.g., allocated memory block portions 510, 512, 514 of memory block 424) within storage system 12. In this example, cache flushing process 10 may determine 318 the actual data reduction rates for data 400 and data 502 (i.e., reduction of data 400 from seven data portions to six data portions and no reduction of data 502) were accurate and may update 320 the training data for machine learning model 418 accordingly.

For example, cache flushing process 10 may provide the actual data reduction rates for data 400 and data 504 to machine learning model 418 to update machine learning model 418. In this manner, cache flushing process 10 may become increasingly accurate when predicting data reduction rates for write request data flushed from a cache memory system to a storage system. Accordingly, cache flushing process 10 may better utilize portions of memory in a storage system and/or may preserve storage system resources when determining which data reduction operations to perform or to not perform on cached data based upon, at least in part, a predicted data reduction rate determined for each write request (e.g., the data of each write request).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving, at a cache memory system, a write request for writing data to a storage system;
   predicting a data reduction rate for the write request;
   allocating one or more portions of memory within the storage system based upon, at least in part, the predicted data reduction rate for the write request; and
   flushing the write request from the cache memory system to the allocated one or more portions of memory within the storage system.

2. The computer-implemented method of claim 1, wherein receiving the write request for writing data to the storage system includes storing the write request within the cache memory system without performing data compression or data deduplication.

3. The computer-implemented method of claim 1, wherein predicting the data reduction rate for the write request includes training a machine learning model to predict the data reduction rate for the write request.

4. The computer-implemented method of claim 3, wherein training the machine learning model to predict the data reduction rate for the write request includes weighting a plurality of data reduction factors for the write request.

5. The computer-implemented method of claim 1, wherein allocating the one or more portions of memory within the storage system based upon, at least in part, the predicted data reduction rate for the write request includes allocating one or more partially utilized memory blocks within the storage system based upon, at least in part, the predicted data reduction rate for the write request.

6. The computer-implemented method of claim 1, wherein flushing the write request from the cache memory system to the allocated one or more portions of memory within the storage system includes performing one or more data reduction operations on the write request based upon, at least in part, the predicted data reduction rate for the write request.

7. The computer-implemented method of claim 3, further comprising:
   in response to flushing the write request from the cache memory system to the allocated one or more portions of memory within the storage system, determining an actual data reduction rate for the write request; and
   updating the machine learning model with the actual data reduction rate for the write request.

8. A computer program product residing on a non-transitory computer readable medium having a plurality of instructions stored thereon which, when executed by a processor, cause the processor to perform operations comprising:
   receiving, at a cache memory system, a write request for writing data to a storage system;
   predicting a data reduction rate for the write request;
   allocating one or more portions of memory within the storage system based upon, at least in part, the predicted data reduction rate for the write request; and
   flushing the write request from the cache memory system to the allocated one or more portions of memory within the storage system.

9. The computer program product of claim 8, wherein receiving the write request for writing data to the storage system includes storing the write request within the cache memory system without performing data compression or data deduplication.

10. The computer program product of claim 8, wherein predicting the data reduction rate for the write request includes training a machine learning model to predict the data reduction rate for the write request.

11. The computer program product of claim 10, wherein training the machine learning model to predict the data reduction rate for the write request includes weighting a plurality of data reduction factors for the write request.

12. The computer program product of claim 8, wherein allocating the one or more portions of memory within the storage system based upon, at least in part, the predicted data reduction rate for the write request includes allocating one or more partially utilized memory blocks within the storage system based upon, at least in part, the predicted data reduction rate for the write request.

13. The computer program product of claim 8, wherein flushing the write request from the cache memory system to the allocated one or more portions of memory within the storage system includes performing one or more data reduction operations on the write request based upon, at least in part, the predicted data reduction rate for the write request.

14. The computer program product of claim 10, wherein the operations further comprise:
   in response to flushing the write request from the cache memory system to the allocated one or more portions of memory within the storage system, determining an actual data reduction rate for the write request; and
   updating the machine learning model with the actual data reduction rate for the write request.

15. A computing system comprising:
   a memory; and
   a processor configured to receive, at a cache memory system, a write request for writing data to a storage system, wherein the processor is further configured to predict a data reduction rate for the write request, wherein the processor is further configured to allocate one or more portions of memory within the storage system based upon, at least in part, the predicted data reduction rate for the write request, and wherein the processor is further configured to flush the write request from the cache memory system to the allocated one or more portions of memory within the storage system.

16. The computing system of claim 15, wherein receiving the write request for writing data to the storage system includes storing the write request within the cache memory system without performing data compression or data deduplication.

17. The computing system of claim 15, wherein predicting the data reduction rate for the write request includes training a machine learning model to predict the data reduction rate for the write request.

18. The computing system of claim 17, wherein training the machine learning model to predict the data reduction rate for the write request includes weighting a plurality of data reduction factors for the write request.

19. The computing system of claim 15, wherein allocating the one or more portions of memory within the storage system based upon, at least in part, the predicted data reduction rate for the write request includes allocating one or more partially utilized memory blocks within the storage system based upon, at least in part, the predicted data reduction rate for the write request.

20. The computing system of claim 15, wherein flushing the write request from the cache memory system to the allocated one or more portions of memory within the storage system includes performing one or more data reduction operations on the write request based upon, at least in part, the predicted data reduction rate for the write request.

* * * * *